United States Patent
Miyauchi et al.

(10) Patent No.: US 10,739,712 B2
(45) Date of Patent: Aug. 11, 2020

(54) FIXING MEMBER, FIXING DEVICE, AND ELECTROPHOTOGRAPHIC IMAGE FORMING APPARATUS

(71) Applicant: CANON KABUSHIKI KAISHA, Tokyo (JP)

(72) Inventors: Yohei Miyauchi, Tokyo (JP); Yasuharu Notoya, Tokyo (JP); Kimihiro Yoshimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/351,974

(22) Filed: Mar. 13, 2019

(65) Prior Publication Data

US 2019/0294089 A1 Sep. 26, 2019

(30) Foreign Application Priority Data

Mar. 22, 2018 (JP) .................................. 2018-055190
Feb. 20, 2019 (JP) .................................. 2019-028564

(51) Int. Cl.
G03G 15/20 (2006.01)
C08F 16/24 (2006.01)
C08L 27/18 (2006.01)
C08L 29/10 (2006.01)

(52) U.S. Cl.
CPC ......... *G03G 15/2057* (2013.01); *C08F 16/24* (2013.01); *C08L 27/18* (2013.01); *C08L 29/10* (2013.01); *G03G 15/206* (2013.01); *G03G 15/2064* (2013.01); *C08F 2800/20* (2013.01); *G03G 2215/2016* (2013.01)

(58) Field of Classification Search
CPC ............. G03G 15/2057; G03G 15/206; G03G 2215/2035; G03G 15/2053; C08L 79/08
USPC ......................................................... 399/333
See application file for complete search history.

(56) References Cited

U.S. PATENT DOCUMENTS

| | | | |
|---|---|---|---|
| 6,582,628 B2 | 6/2003 | Kondo et al. | |
| 6,895,206 B2 | 5/2005 | Nakamura et al. | |
| 9,575,439 B2 | 2/2017 | Tsuji | |
| 2002/0132906 A1 | 9/2002 | Kondo et al. | |
| 2004/0202865 A1* | 10/2004 | Homola ................ | B29C 43/021 428/421 |

(Continued)

FOREIGN PATENT DOCUMENTS

| JP | 9-096981 A | 4/1997 |
|---|---|---|
| JP | 2000-19879 A | 1/2000 |

(Continued)

OTHER PUBLICATIONS

JP2010197579A pub data: Sep. 2010 Japan Hisae G03G15/02 (Year: 2010).*

(Continued)

*Primary Examiner* — Walter L Lindsay, Jr.
(74) *Attorney, Agent, or Firm* — Venable LLP

(57) ABSTRACT

Provided is a fixing member having an outer surface including excellent toner releasability and excellent scratch resistance, wherein the fixing member has a base material, an elastic layer, and a release layer in this order, the release layer including a tetrafluoroethylene/perfluoroalkyl vinyl ether copolymer, and has a loss tangent at a frequency of 10 Hz and 180° C. of $5.0\times10^{-2}$ or more and $3.0\times10^{-1}$ or less.

12 Claims, 4 Drawing Sheets

(56) References Cited

U.S. PATENT DOCUMENTS

| | | | |
|---|---|---|---|
| 2006/0154078 A1* | 7/2006 | Watanabe | C09J 163/00 |
| | | | 428/413 |
| 2007/0110993 A1 | 5/2007 | Pickering | |
| 2010/0105584 A1* | 4/2010 | Avataneo | C08F 214/182 |
| | | | 508/155 |
| 2013/0220500 A1* | 8/2013 | Okabe | B60C 1/0016 |
| | | | 152/209.18 |
| 2013/0302074 A1 | 11/2013 | Lee et al. | |
| 2014/0321893 A1* | 10/2014 | Qi | G03G 15/2057 |
| | | | 399/333 |
| 2015/0355581 A1* | 12/2015 | Matsunaka | C09J 183/04 |
| | | | 399/333 |
| 2016/0223967 A1 | 8/2016 | Mukoyama et al. | |

FOREIGN PATENT DOCUMENTS

| JP | 2003-029484 A | | 1/2003 | | |
|---|---|---|---|---|---|
| JP | 2003-82187 A | | 3/2003 | | |
| JP | 2004-053847 A | | 2/2004 | | |
| JP | 2004-161921 A | | 6/2004 | | |
| JP | 2010-197579 | * | 9/2010 | | G03G 15/20 |
| JP | 654032 B2 | * | 8/2015 | | G03G 15/20 |
| JP | 2015-212810 A | | 11/2015 | | |
| JP | 2018-001109 A | | 1/2018 | | |
| JP | 2018-180488 A | | 11/2018 | | |

OTHER PUBLICATIONS

Y. Kitazaki et al., "Extended Fowkes' Equation and Evaluation of Surface Tension of Polymer Solid," 8(3) J. Adhes. Soc. Jpn. 131-141 (1972).

Extended European Search Report in European Application No. 19164105.9 (dated Sep. 6, 2019).

Extended European Search Report in European Application No. 19164106.7 (dated Sep. 5, 2019).

Notoya et al., U.S. Appl. No. 16/351,994, filed Mar. 13, 2019.

\* cited by examiner

FIG. 1A
FIG. 1B
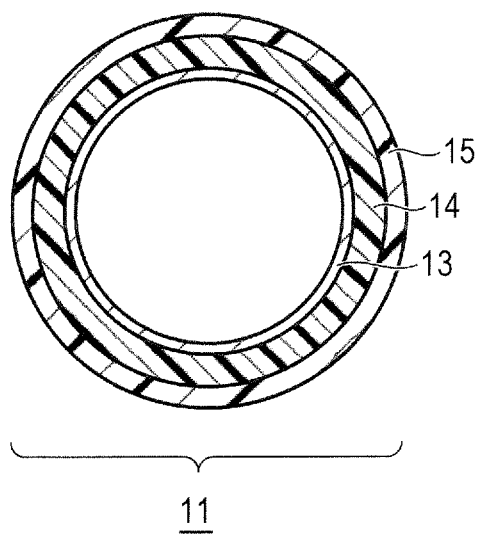
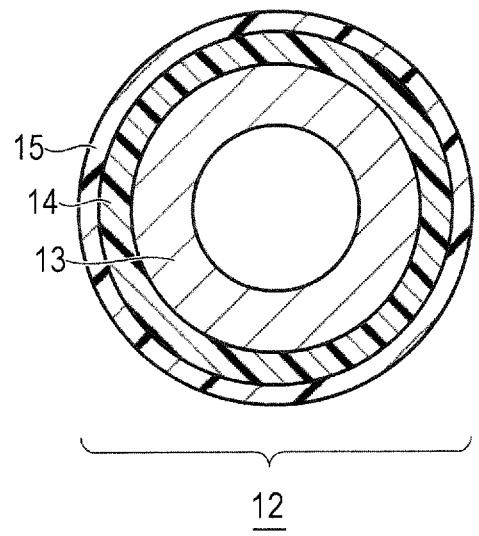

FIXING MEMBER, FIXING DEVICE, AND ELECTROPHOTOGRAPHIC IMAGE FORMING APPARATUS

BACKGROUND OF THE INVENTION

Field of the Invention

The present disclosure relates to a fixing member, a fixing device using the same, and an electrophotographic image forming apparatus including the same.

Description of the Related Art

In general, in a fixing device used for an electrophotographic image forming apparatus (hereinafter, also referred to as "image forming apparatus") such as a copying machine or a laser printer, rotating bodies such as a pair of a heated roller and a roller, a film and a roller, a belt and a roller, and a belt and another belt are contacted with pressure. In addition, a recording medium such as paper holding an image formed by an unfixed toner is introduced into a pressure contact portion (hereinafter, referred to as "fixing nip portion") formed between the rotating bodies, and an unfixed toner is heated and melted, such that the image is fixed on the recording medium. The rotating body with which the unfixed toner image on the recording medium is in contact is called a fixing member, and is called a fixing roller, a fixing film, and a fixing belt depending on a form thereof.

In order to suppress adhesion of the toner, as a release layer constituting an outer surface of the fixing member (hereinafter, referred to as "release layer"), a release layer including a fluororesin, specifically, for example, tetrafluoroethylene/perfluoroalkyl vinyl ether copolymer (hereinafter, also referred to as "PFA") may be used.

Japanese Patent Application Laid-Open No. 2000-19879 discloses that low abrasion resistance of a release layer including a fluororesin used for a heating fixing roller can be improved by a release layer including a filler such as carbon black together with a fluororesin. However, it is also described that releasability is inferior to that of a release layer not including a filler since the filler has poor releasability as compared with the fluororesin.

As disclosed in Japanese Patent Application Laid-Open No. 2000-19879, it is preferable not to contain a filler in order to ensure high toner releasability of a surface of the release layer including the fluororesin. Meanwhile, the release layer formed by including only the fluororesin has a problem of low scratch resistance.

SUMMARY OF THE INVENTION

An embodiment of the present disclosure is directed to providing a fixing member capable of achieving both toner releasability and scratch resistance at a high level.

Another embodiment of the present disclosure is directed to providing a fixing device that contributes to stable formation of a high-quality electrophotographic image. Still another embodiment of the present disclosure is directed to providing an electrophotographic image forming apparatus capable of forming a high-quality electrophotographic image.

According to an embodiment of the present disclosure, there is provided a fixing member including a base material, an elastic layer, and a release layer in this order, wherein the release layer includes a tetrafluoroethylene/perfluoroalkyl vinyl ether copolymer, and the release layer has a loss tangent at a frequency of 10 Hz and 180° C. of $5.0 \times 10^{-2}$ or more and $3.0 \times 10^{-1}$ or less.

According to another embodiment of the present disclosure, there is provided a fixing device including the fixing member and an electrophotographic image forming apparatus including the fixing device.

Further features of the present invention will become apparent from the following description of exemplary embodiments with reference to the attached drawings.

BRIEF DESCRIPTION OF THE DRAWINGS

FIG. 1A is a schematic cross-sectional view of a fixing belt A which is an example of the present disclosure.

FIG. 1B is a schematic cross-sectional view of a fixing roller B which is an example of the present disclosure.

DESCRIPTION OF THE EMBODIMENTS

Figure 2:
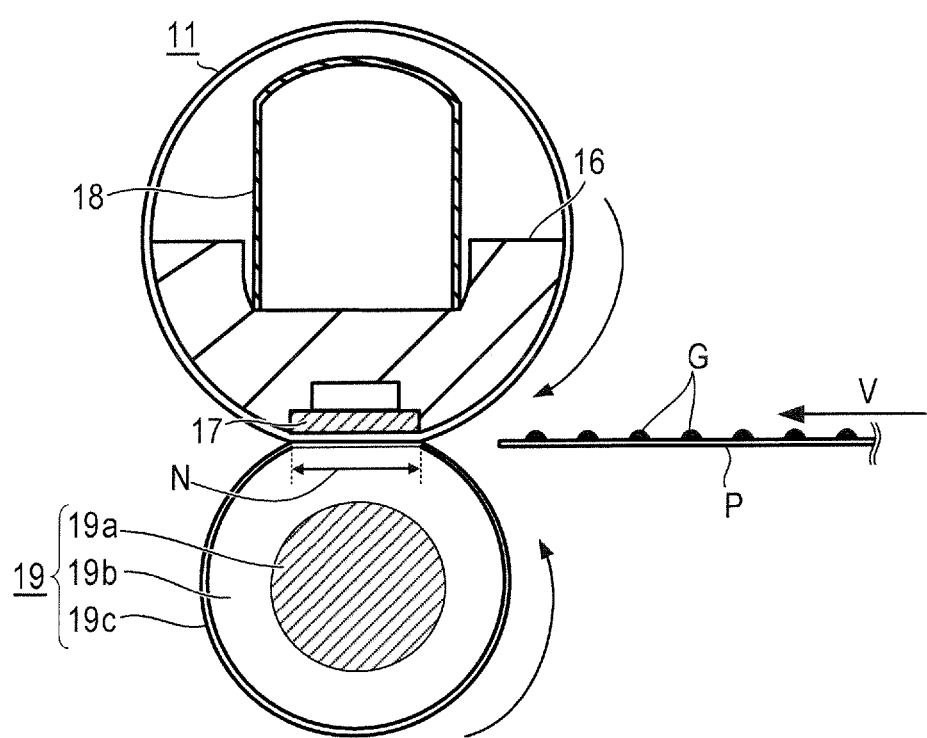
FIG. 2 is a schematic cross-sectional view of a fixing device using a fixing belt according to the present disclosure.

Preferred embodiments of the present invention will now be described in detail in accordance with the accompanying drawings.

The present inventors found that a fixing member including PFA and having a release layer in which a loss tangent at a frequency of 10 Hz and a temperature of 180° C. is $5.0 \times 10^{-2}$ or more and $3.0 \times 10^{-1}$ or less is capable of achieving the above-described object well.

The release layer exhibiting this loss tangent value allows force received from the outside to dissipate. Accordingly, it is considered that the release layer can easily restore an original shape by a strong restoring force even when once the release layer is deformed. Therefore, it is considered that high scratch resistance can be achieved.

Further, the present inventors found that these physical properties can be achieved, for example, by increasing molecular mobility of a polymer chain of PFA in the release layer. In other words, even though a filler such as carbon black is not contained in the release layer, the release layer having the above physical properties can be formed. Therefore, in the release layer exhibiting the physical properties described above, it is possible to maintain high toner releasability inherent in a fluororesin.

An increase in molecular mobility of a polymer chain of PFA to achieve the physical properties can be achieved by, for example, containing a fluorine-containing polymer compound different from PFA (hereinafter, simply referred to as "fluorine-containing polymer compound") in the release layer so that the fluorine-containing polymer compound interacts with the polymer chain of PFA.

Since PFA has small surface free energy, it is difficult for PFA to be compatible with other fluorine-containing polymer compounds. Therefore, it was considered that it is difficult to mix PFA and the fluorine-containing polymer compound without phase separation. However, as a result of a review made by the present inventors, it was found that PFA and the fluorine-containing polymer compound can be made into a chemically stable mixture without phase separation by applying a strong shearing force in a state in which PFA in a molten state and oil-type fluorine-containing polymer compound are mixed, and kneading the mixture.

It is considered that the shape of PFA in a molten state is unforlded in a chain shape even including a crystal region. In that state, the fluorine-containing polymer compound having a molecular structure similar to PFA exists in a compatible state or in a state in which the fluorine-containing polymer compound is microdispersed in PFA. Therefore, at room temperature (for example, 25° C.) to an actual use temperature range of the fixing member (for example, 100 to 250° C.), it is considered that PFA and the fluorine-containing polymer compound in the release layer do not undergo phase separation, and a state in which the fluorine-containing polymer compound and PFA are chemically and stably mixed can be achieved.

Further, it is considered that in this state, when the fluorine-containing polymer compound lowers crystallinity of PFA and also interacts with an amorphous region, the loss tangent of the release layer at a frequency of 10 Hz and a temperature of 180° C. can have a high value of from $5.0\times10^{-2}$ or more and $3.0\times10^{-1}$ or less.

Further, in order to improve flexibility of PFA, there is a known method for increasing a proportion of perfluoroalkyl vinyl ether (hereinafter, also referred to as "PAVE") which is a copolymerization component. However, in the study of the present inventors, even when PFA manufactured by this method was used, it was not possible to obtain a release layer having a loss tangent at a frequency of 10 Hz and a temperature of 180° C. within a range of $5.0\times10^{-2}$ or more and $3.0\times10^{-1}$ or less.

Hereinafter, the fixing member and the fixing device of the present disclosure are described in detail based on specific configurations.

1. Fixing Member

FIGS. 1A and 1B are cross-sectional views illustrating different modes of a fixing member according to the present disclosure, respectively. FIG. 1A is a fixing member having an endless belt shape (hereinafter, also referred to as "fixing belt 11"), and FIG. 1B is a fixing member having a roller-shape (hereinafter, also referred to as "fixing roller 12").

The fixing members according to FIGS. 1A and 1B have a base material 13, an elastic layer 14 coating a periphery of the base material, and a release layer 15 coating a surface of the elastic layer. In addition, the release layer 15 may be adhered to a peripheral surface of the elastic layer 14 as an adhesive layer which is not shown.

(1) Base Material

As a material of the base material 13, a metal and an alloy such as aluminum, iron, stainless steel, nickel, and a heat-resistant resin such as polyimide are used.

In the fixing belt 11, a base material having an endless belt shape is used as the base material 13. As the material of the base material 13, for example, materials having excellent heat resistance such as nickel, stainless steel, and polyimide may be included. A thickness of the base material 13 is not particularly limited, but for example, preferably 20 to 100 µm, from the viewpoints of strength, flexibility, and heat capacity.

In the fixing roller 12, for example, a solid or hollow mandrel is used as the base material 13. As a material of the mandrel, a metal such as aluminum, iron, or stainless steel or an alloy thereof may be included. When the hollow mandrel is used, it is possible to install a heat source inside.

A surface treatment may be performed to an outer surface of the base material 13 in order to impart adhesiveness to the elastic layer 14. For the surface treatment, it is possible to use one or a combination of a plurality of physical treatments such as blasting, lapping and polishing, and a chemical treatment such as an oxidation treatment, a coupling agent treatment, and a primer treatment.

When the elastic layer 14 including silicone rubber is installed on the surface of the base material 13, it is preferable to apply a primer treatment to the surface of the base material 13 in order to improve adhesiveness between the base material 13 and the elastic layer 14. Examples of a primer used for the primer treatment may include a coating material in which a silane coupling agent, a silicone polymer, hydrogenated methylsiloxane, alkoxysilane, a reaction promoting catalyst, or a coloring agent such as red iron oxide is properly blended and dispersed in an organic solvent.

The primer may be appropriately selected depending on the material of the base material 13, the type of the elastic layer 14, or a form of a cross-linking reaction. In particular, when the elastic layer 14 includes a large amount of unsaturated aliphatic groups, a primer containing a hydrosilyl group is preferably used in order to impart adhesiveness by reaction with the unsaturated aliphatic group. When the elastic layer 14 includes a large amount of hydrosilyl groups, a primer containing an unsaturated aliphatic group is preferably used. In addition thereto, as the primer, primers containing an alkoxy group may also be included. As the primer, a commercially available product may be used. Further, the primer treatment includes a step of applying the primer to a surface of the base material 13 (a surface to be adhered to the elastic layer 14), followed by drying or firing.

(2) Elastic Layer

As a material constituting the elastic layer 14, it is preferable to use a heat-resistant rubber such as silicone rubber or fluorine rubber. Among them, an addition-curing type silicone rubber is preferable.

A thickness of the elastic layer 14 may be appropriately designed in consideration of surface hardness of the fixing member and a width of a fixing nip portion to be formed. When the fixing member is the fixing belt 11, the thickness of the elastic layer 14 is preferably 100 µm or more and 500 µm or less, and more preferably 200 µm or more and 400 µm or less.

In addition, when the fixing member is the fixing roller 12, the thickness of the elastic layer 14 is preferably 100 µm or more and 3 mm or less, and more preferably 300 µm or more and 2 mm or less. By falling the thickness of the elastic layer 14 within this range, it is possible to secure a sufficient width of the fixing nip portion by deformation of the base material 13 when the fixing member is incorporated in a fixing device.

The elastic layer 14 may include a filler. The filler is added in order to control thermal conductivity, heat resistance and an elastic modulus. Specifically, examples of the filler may include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), carbon fiber (C), carbon nanotube (C), and the like.

In addition, as a material constituting the elastic layer 14, a reaction control agent (inhibitor) called an inhibitor for controlling a reaction start time may be blended. Known materials such as methylvinyltetrasiloxane, acetylene alcohols, siloxane-modified acetylene alcohol, and hydroperoxide are used as the reaction control agent.

(3) Release Layer

The release layer 15 includes PFA and has a loss tangent at a frequency of 10 Hz and a temperature of 180° C. of $5.0\times10^{-2}$ or more and $3.0\times10^{-1}$ or less. In particular, the corresponding loss tangent is preferably $7.0\times10^{-2}$ or more and $2.0\times10^{-1}$ or less. As described above, the release layer 15 exhibiting the loss tangent value allows a force received from the outside to dissipate, and thus it is considered that the release layer can easily restore an original shape by a strong restoring force even when once the release layer is deformed. Therefore, it is considered that high scratch resistance can be achieved.

Further, the release layer 15 having such physical properties can be achieved by suppressing molecular mobility of the polymer chain of PFA in the release layer 15. In other words, even though a filler such as carbon black is not contained in the release layer 15, the release layer 15 having the above-described physical properties can be formed. Therefore, in the release layer 15 exhibiting the physical properties described above, it is possible to maintain high toner releasability inherent in a fluororesin.

<Thickness of Release Layer>

A thickness of the release layer 15 is preferably 3 μm or more, and particularly preferably 10 μm or more from the viewpoint of suppressing abrasion of the surface when the fixing member is used. In addition, from the viewpoint of suppressing decrease in thermal conductivity in a thickness direction as the fixing member, the thickness of the release layer is preferably 50 μm or less, and particularly preferably 30 μm or less.

In order to increase the molecular mobility of the polymer chain of PFA for achieving the physical properties described above, any method can be used as long as it is possible to increase the molecular mobility of the polymer chain of PFA. For example, the physical properties can be realized by containing the fluorine-containing polymer compound in the release layer so that the fluorine-containing polymer compound interacts with the polymer chain of PFA. Then, the fixing member having this release layer can be obtained, for example, through the following (Step 1) to (Step 4).

(Step 1) A pellet type PFA is stirred and mixed with a fluorine-containing polymer compound to obtain a mixture.

(Step 2) The mixture is melt-kneaded and extruded at a temperature of a melting point (280° C.) or more of PFA and 450° C. or less using a twin-screw extruder to obtain a melt-kneaded product of PFA and the fluorine-containing polymer compound (hereinafter, referred to as "melt-kneaded product").

(Step 3) The melt-kneaded product is pelletized, and the pellets are extrusion-molded into a tube shape with an extrusion molding machine to obtain a tube for a release layer.

(Step 4) An outer surface of an elastic layer formed on the base material is coated with the tube for a release layer.

Regarding (Step 1) to (Step 4) related to the manufacture of the release layer, a method using PFPE as the fluorine-containing polymer compound is described in detail below.

(Step 1)

Pellets of PFA and PFPE are stirred and mixed in a stirrer at a predetermined amount ratio to obtain a mixture of PFA and PFPE. Herein, stirring conditions are not particularly limited, but it is preferable to stir and mix PFA and PFPE, for example, in a heated state, particularly, in equal to or higher than the glass transition point of PFA (100° C.), which is a state where mobility of polymer chains of PFA and PFPE is enhanced. It is more preferable to pulverize the PFA pellets into a powder form so that a specific surface area is increased, and to mix the PFA pellets with PFPE in a state in which a contact area with PFPE increases.

(Step 2)

The pellets of the mixture obtained in Step 1 are injected into a twin-screw extruder and heated to a temperature equal to or higher than a melting point of PFA, for example, 280° C. or more and 450° C. or less, and kneaded under predetermined conditions while melting PFA. In particular, it is more preferable to heat the pellets at 330° C. or more, further 350° C. or more in order to increase mobility of the polymer chain of PFA and to enhance an interaction with PFPE. Further, in order to suppress thermal decomposition, it is preferable to heat the pellets at 420° C. or less.

Further, in order to effectively shear, L/D (L: screw length, D: screw diameter) is preferably 10 or more and 100 or less. Further, the screw rotation speed is preferably 100 to 1000 rpm, and it is more preferable to use a screw provided with a groove or notch in a kneading element.

In addition, in step 2, a state in which PFPE is mixed with PFA in a molten state has a lower melt viscosity as compared with a state in which only PFA is melted. Thus, it is possible to determine a temperature at the time of extrusion to be lower than a temperature at which the melt of PFA alone is extruded.

Further, by melting and kneading the obtained melt-kneaded product with a twin-screw extruder, the interaction between PFA and PFPE can be further enhanced.

(Step 3)

The melt-kneaded product obtained in step 2 is pelletized by cutting, and the obtained pellets are molded into a tube shape with an extrusion molding machine to obtain a tube for a release layer.

In addition, the elastic layer and the release layer may be adhered to each other by an adhesive layer. As the adhesive layer, a thermosetting silicone rubber adhesive is preferably used.

Further, a storage elastic modulus E of the release layer at a frequency of 10 Hz of and a measurement temperature of 180° C. is preferably 5.0 MPa or more and 60 MPa or less, and more preferably 10 MPa or more and 30 MPa or less. By falling the storage elastic modulus E within the above-described numerical range, it is possible to give sufficient flexibility to the release layer. As a result, followability to irregularities of the paper becomes good, and thus fixing unevenness can be further improved. In addition, these physical properties can be achieved by using PFPE as a fluorine-containing polymer compound interacting with the polymer chain of PFA.

The loss tangent and the storage elastic modulus E of the release layer can be measured using, for example, a dynamic viscoelasticity measuring device (Product name: Rheogel E4000, manufactured by UBM Co., Ltd.).

The measurement can be performed, for example, by the following method.

A test portion (thickness of 30 to 200 width of 5 mm, length of 20 mm) having the same composition as the release layer is prepared. A test portion is mounted on a tensile jig, and a measurement temperature is raised from 30° C. up to 250° C. at a heating rate of 5.0° C./min using a sinusoidal wave with a distance of 10 mm between chucks, a frequency of 10 Hz and an amplitude of 0.03 mm, thereby calculating a value at the temperature 180° C.

The test portion may be prepared by cutting out from the tube for a release layer, or may be prepared by cutting the release layer together with the elastic layer from the fixing member and removing the elastic layer. When the elastic layer includes a crosslinked silicone rubber, for example, the elastic layer can be removed by using a resin dissolving agent (Product name: e-solve series, manufactured by Kaneko Chemical Co., Ltd.).

(Step 4)

By previously performing a sodium treatment, an excimer laser treatment, an ammonia treatment, and the like, on the inner surface of the manufactured tube for a release layer, the surface is activated to improve adhesiveness. An adhesive is applied on the elastic layer, an outer surface of the adhesive is coated and stacked with the tube for a release layer. A coating method is not particularly limited, but a method for coating the adhesive as a lubricant or a method for expanding and coating the tube for a release layer can be used. After coating, excessive adhesive is scrapped off and removed. Further, the fixing member of the present disclosure may be manufactured by curing and adhering the adhesive by a heating unit such as an electric furnace, or the like, and processing an end portion as necessary.

<PFA>

Examples of PFA may include a copolymer of tetrafluoroethylene and at least one selected from perfluoromethyl vinyl ether ($CF_2=CF-O-CF_3$), perfluoroethyl vinyl ether ($CF_2=CF-O-CF_2CF_3$), and perfluoropropyl vinyl ether ($CF_2=CF-O-CF_2CF_2CF_3$).

A content ratio of PAVE in PFA is preferably 1 mol % or more and 5 mol % or less, and particularly preferably 3 mol % or more and 5 mol % or less, in the molecular chain. By falling the content ratio of PAVE in PFA within the above-described range, a resin viscosity at the time of melt-kneading with the fluorine-containing polymer compound may be reduced, and an interaction with the fluorine-containing polymer compound may be further enhanced.

From the viewpoint of controllability of the molecular motion of the fluorine-containing polymer compound in the release layer and enhancement of the interaction with the fluorine-containing polymer compound at the time of melt-kneading, a melt flow rate (MFR) of PFA is preferably 1.0 g/10 min or more and 10.0 g/10 min or less, and particularly preferably 1.5 g/10 min or more and 3.0 g/10 min or less. In addition, the MFR of PFA is a value measured according to Method A of JIS K 7210-1:2014 at a temperature of 372° C. under a load of 5 kgf using a standard die.

As PFA, commercially available products can be used, and specific examples are provided as follows.

"451 HP-J", "959 HP-Plus", "350-J", and "950 HP-Plus" (all products manufactured by Du Pont Mitsui Fluorochemicals Co., Ltd.)

"P-66P", "P-66 PT", and "P-802UP" (all products manufactured by AGC Inc.)

"AP-230", "AP-231SH", and the like (all products manufactured by Daikin Industries, Ltd.)

"6502N" (product manufactured by 3M Company).

<PFPE>

As the fluorine-containing polymer compound, for example, perfluoropolyether (PFPE) may be included.

Specifically, for example, PFPE having a structure represented by Structural Formula (1) below may be included. Among these PFPEs, PFPE which becomes an oil form at a melting point of PFA is particularly preferably used.

Structural Formula (1)

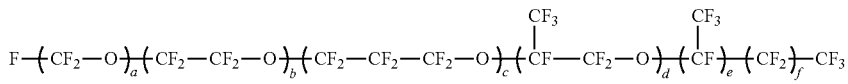

In Structural Formula (1), a, b, c, d, e and f are each independently 0 or a positive integer satisfying $1 \leq a+b+c+d+e+f \leq 600$, and at least one of a, b, c, and d is a positive integer.

In addition, the order of existence of each repeating unit in Structural Formula (1) is not limited to the order described in Structural Formula (1). Further, each repeating unit may exist at a plurality of portions in the PFPE represented by Structural Formula (1). PFPE represented by Structural Formula (1) may be a block copolymer or a random copolymer.

From the viewpoint of better interaction with a polymer chain of PFA to suppress molecular mobility of the polymer chain of PFA, a number average molecular weight of PFPE is preferably 5,000 or more, more preferably 7,000 or more, still more preferably 100,000 or less, and particularly preferably 30,000 or less. In addition, PFPE having the above-described molecular weight has high heat resistance, and even when PFPE is heated at 350° C. for 30 minutes in air, weight loss is less than 1%, and thermal decomposition of PFPE rarely occurs during melt-kneading.

When PFPE is used as the fluorine-containing polymer compound, a content of PFPE in the release layer is 1 mass % or more and 40 mass % or less, and particularly 5 mass % or more and 30 mass % or less with respect to the total amount of PFA and PFPE. By falling the PFPE content within the above-described range, the loss tangent of the release layer can be easily adjusted within the above-described numerical range.

Specific examples of PFPE having a structure included in the structure represented by General Formula (1) are listed below.

PFPE having a structure represented by Structural Formula (2) (for example, "Demnum S200", "Demnum S100" (all products manufactured by Daikin Industries, Ltd.)):

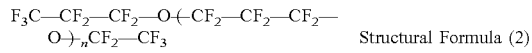

Structural Formula (2)

In Structural Formula (2), n represents an integer of 1 or more.

PFPE having a structure represented by Structural Formula (3) (for example, "Krytox GPL107", "Krytox GPL106" (all products manufactured by Chemours Company):

Structural Formula (3)

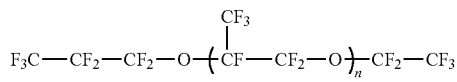

In Structural Formula (3), n represents an integer of 1 or more.

PFA represented by Structural Formula (4) (for example, "Fomblin M60", "Fomblin M30" (all products manufactured by Solvay Japan, Ltd.):

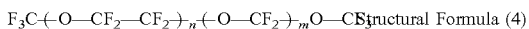

In Structural Formula (4), n and m each independently represent an integer of 1 or more.

2. Thermal Fixing Device

A thermal fixing device according to an embodiment of the present disclosure includes a rotating body for heating and a rotating body for pressurizing arranged to form a fixing nip portion with the rotating body for heating. Examples of a combination of the rotating body for heating and the rotating body for pressurizing may include a heating roller and an elastic pressure roller opposed to the heating roller, a heating film and an elastic pressure roller arranged in contact with the heating film, a heating belt and an elastic pressure roller disposed in contact with the heating belt, a heating belt and a pressure belt disposed in contact with the heating belt.

(1) Fixing Device Using Fixing Belt

FIG. 2 is a cross-sectional view in a direction orthogonal to a longitudinal direction of the thermal fixing device including a fixing belt 11 for heating and an elastic pressure roller 19.

The fixing belt 11 is a fixing belt according to an embodiment of the present disclosure. The fixing belt 11 is loosely fitted to the outside of the belt guide member 16. A rigid stay for pressurizing 18 is inserted into the inside of the belt guide member 16. The belt guide member 16 is formed of, for example, a resin having heat resistance and heat insulating properties.

A ceramic heater 17 as a heat source is provided at a position where the belt guide member 16 and an inner surface of the fixing belt 11 are in contact with each other. The ceramic heater 17 is engaged and fixed in a groove portion installed along a longitudinal direction of the belt guide member 16. The ceramic heater 17 is electrically conducted by a unit, which is not shown, to generate heat.

In the elastic pressure roller 19, for example, an elastic layer 19b including cured silicone rubber is installed on a peripheral surface of a mandrel 19a made of stainless steel. Further, a surface layer 19c including a fluororesin is installed on the peripheral surface of the elastic layer 19b. A thickness of the surface layer 19c is, for example, 50 μm.

Each pressurizing spring (not shown) is compressed between both end portions of the rigid stay for pressurizing 18 and a spring receiving member (not shown) at a device chassis side to apply a force pressing down to the rigid stay for pressurizing 18. Thus, a lower surface of the ceramic heater 17 disposed on the lower surface of the belt guide member 16 and an upper surface of the elastic pressure roller 19 are contacted with pressure with the fixing belt 11 interposed therebetween, thereby forming a predetermined fixing nip portion N. That is, the lower surface of the ceramic heater 17 is arranged in contact with an inner peripheral surface of the fixing belt 11.

In this fixing nip portion N, a recording medium P, which is an object to be heated in which an image is formed by an unfixed toner G, is nipped and conveyed at a conveying speed V. Thus, the toner image is heated and pressurized. As a result, the toner image is melted and the colors of the image are mixed, and then cooled, and thus the toner image is fixed on the recording medium P.

(2) Thermal Fixing Device Using Fixing Roller

Figure 3:
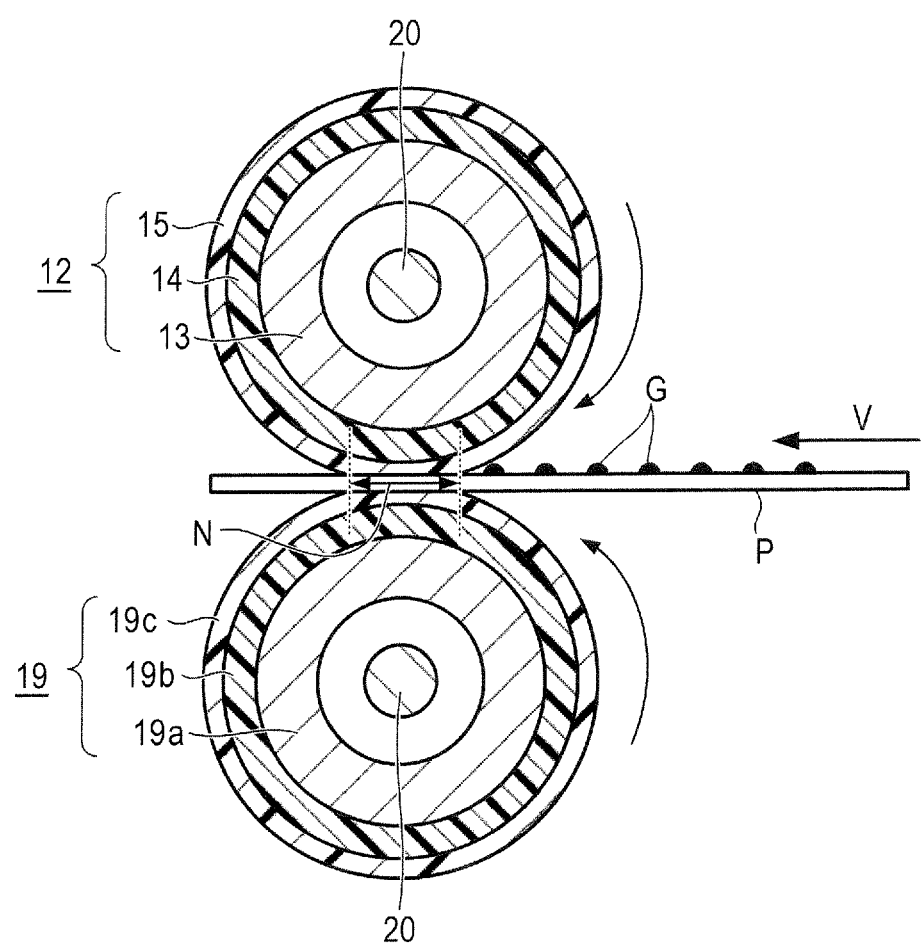
FIG. 3 is a schematic cross-sectional view of a fixing device using the fixing roller according to the present disclosure.

FIG. 3 is a cross-sectional view of a thermal fixing device in a direction perpendicular to a longitudinal direction, the thermal fixing device including a fixing roller 12 for heating, an elastic pressure roller 19 arranged opposite to the fixing roller 12, and a heater 20 as a heating unit for the fixing roller 12.

The fixing roller 12 is a fixing roller according to an embodiment of the present disclosure. In the fixing roller 12, the elastic layer 14 is formed on an outer peripheral surface of the base material 13, and the release layer 15 is further formed at an outer side thereof.

The fixing roller 12 and the elastic pressure roller 19 are rotatably pressed against each other by a pressurizing unit (not shown) to form a fixing nip portion N.

Inside the fixing roller 12 and the elastic pressure roller 19, a heater 20 as a heat source for supplying heat necessary for melting the unfixed toner G is installed. As the heater 20, a halogen heater is generally used. In some cases, a plurality of halogen heaters are installed inside according to the size of the recording medium P which is conveyed.

A rotating force is applied to the fixing roller 12 and the elastic pressure roller 19 through end portions of the base material 13 and the mandrel 19a by a unit which is not shown, and the rotation is controlled so that a moving speed on the surface of the fixing roller 12 is substantially equal to the conveying speed V of the recording medium P. At this time, the rotating force may be applied to any one of the fixing roller 12 and the elastic pressure roller 19 having an elastic property, the other one may be rotated by the driven rotation, or the rotating force may be applied to both sides.

In the fixing nip portion N of the thus-formed fixing device, the recording medium P, which is an object to be heated in which the image is formed by the unfixed toner G, is nipped and conveyed. Thus, the toner image is heated and pressurized. As a result, the toner image is melted and mixed, and then cooled, and thus the toner image is fixed on the recording medium P.

3. Image Forming Apparatus

As the image forming apparatus, there are a multifunction machine, a copying machine, a facsimile, a printer, and the like, using an electrophotographic method. Here, the overall constitution of the image forming apparatus is briefly described by using a color laser printer as an example.

Figure 4:
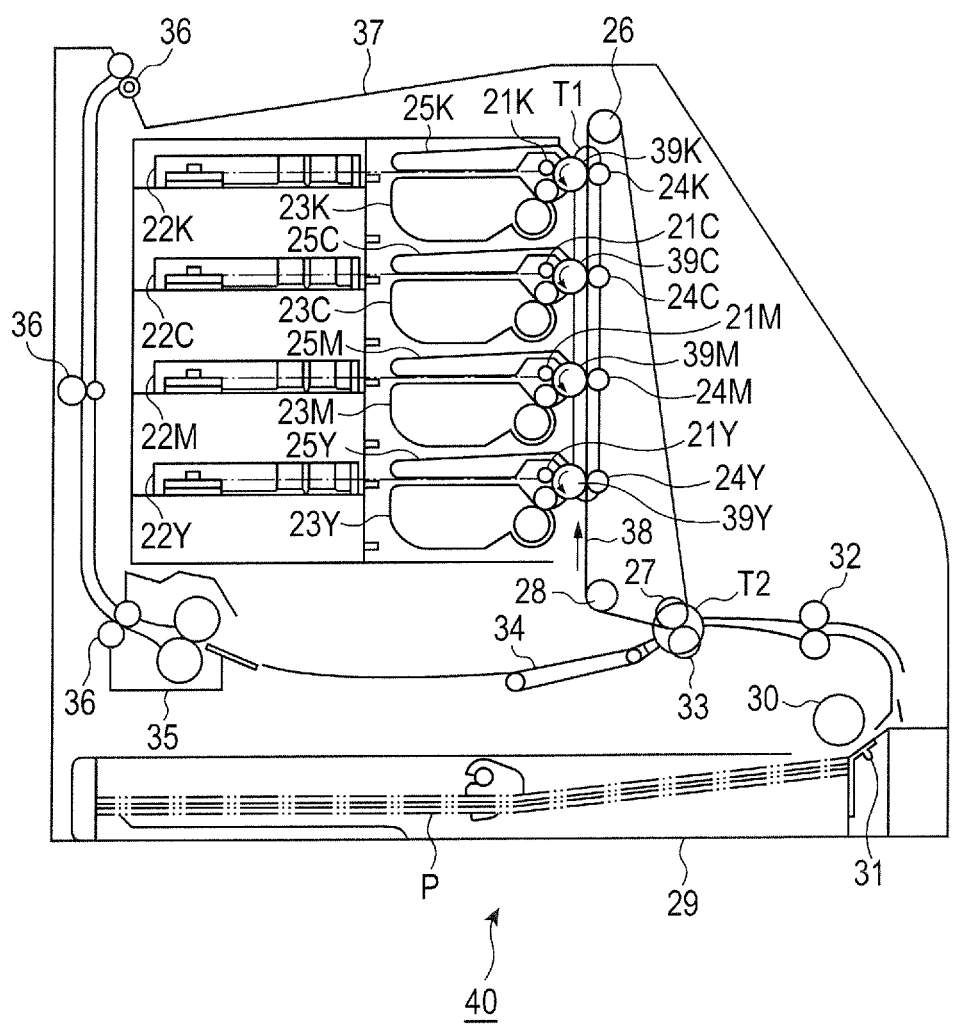
FIG. 4 is a schematic cross-sectional view illustrating an embodiment of the electrophotographic image forming apparatus of the present disclosure.

FIG. 4 is a schematic cross-sectional view of a laser printer 40 according to an embodiment of the present disclosure. The laser printer 40 shown in FIG. 4 includes an image forming unit including an electrophotographic photosensitive drum 39 (hereinafter, referred to as "photosensitive drum 39") which rotates at a constant speed for each color of yellow (Y), magenta (M), cyan (C), and black (K). In addition, the laser printer includes an intermediate transfer body 38 which holds a color image that is developed and multi-transferred in the image forming unit and further transfers the color image to the recording medium P fed from a feeding unit.

A photosensitive drum 39 (39Y, 39M, 39C, and 39K) is rotationally driven in a counterclockwise direction by a driving unit (not shown) as shown in FIG. 4.

On the periphery of the photosensitive drum 39, a charging device 21 (21Y, 21M, 21C, and 21K) which uniformly charges a surface of the photosensitive drum 39, a scanner unit 22 (22Y, 22M, 22C, and 22K) which irradiates a laser beam based on image information and forms an electrostatic latent image on the photosensitive drum 39, a developing unit 23 (23Y, 23M, 23C, and 23K) which develops the formed image as the toner image by adhering the toner to the electrostatic latent image, a primary transfer roller 24 (24Y, 24M, 24C, and 24K) which transfers the toner image on the photosensitive drum 39 through the intermediate transfer body 38 to a primary transfer portion T1, and a cleaning unit 25 (25Y, 25M, 25C, and 25K) having a cleaning blade that removes a transfer residual toner remaining on the surface of the photosensitive drum 39 after transfer, are sequentially arranged according to a rotation direction thereof.

At the time of image formation, a belt-shaped intermediate transfer body 38 stretched around the rollers 26, 27, and 28 rotates, and each color toner image formed on each photosensitive drum 39 is superimposed on the intermediate transfer body 38 to be primarily transferred, thereby forming a color image.

The recording medium P is conveyed to a secondary transfer portion T2 by a conveying unit so as to be synchronized with the primary transfer with respect to the intermediate transfer body 38. The conveying unit has a feeding cassette 29, a feeding roller 30, a separating pad 31, and a registration roller pair 32 that accommodate a plurality of recording media P. At the time of image formation, the feeding roller 30 is rotated in accordance with an image forming operation to separate the recording medium P in the feeding cassette 29 one by one, and the recording medium P is conveyed to the secondary transfer portion T2 in synchronization with the image forming operation by the registration roller pair 32.

A movable secondary transfer roller 33 is arranged in the secondary transfer portion T2. The secondary transfer roller 33 is movable in a generally vertical direction. In addition, upon image transfer, the secondary transfer roller 33 is pressed by the intermediate transfer body 38 with a predetermined pressure through the recording medium P. Here, at the same time, a bias is applied to the secondary transfer roller 33 so that the toner image on the intermediate transfer body 38 is transferred to the recording medium P.

Since the intermediate transfer body 38 and the secondary transfer roller 33 are driven, the recording medium P sandwiched therebetween is conveyed at a predetermined conveying speed V in a direction of the left arrow shown in FIG. 4, and further conveyed to a fixing unit 35, which is the next step, by the conveying belt 34. In the fixing unit 35, heat and pressure are applied so that a transferred toner image is fixed on the recording medium P. The recording medium P is discharged onto a discharge tray 37 on an upper surface of the apparatus by a discharge roller pair 36.

In addition, by applying the fixing device of the present disclosure illustrated in FIGS. 2 and 3 to the fixing unit 35 and the secondary transfer roller 33 of the electrophotographic image forming apparatus exemplified in FIG. 4, it is possible to obtain an image forming apparatus capable of providing a high-quality image having excellent image uniformity.

According to an embodiment of the present disclosure, it is possible to obtain a fixing member having an outer surface provided with excellent toner releasability and excellent scratch resistance. Further, according to another embodiment of the present disclosure, it is possible to obtain a fixing device and an electrophotographic image forming apparatus that contribute to the stable formation of a high-quality electrophotographic image.

EXAMPLE

Hereinafter, the present disclosure is specifically described with reference to Examples. In addition, the present disclosure is not limited to Examples below.

<Preparation of PFA>

PFA shown in Table 1 and PFPE shown in Table 2 were used as raw materials for forming a fluororesin tube for a release layer of a fixing belt according to Examples.

TABLE 1

| PFA | |
| --- | --- |
| PFA-1 | "451HP-J" (manufactured by Du Pont Mitsui Fluorochemicals Co., Ltd.) 451HP-J contains 1.2 mol % of PAVE. |
| PFA-2 | "959HP-Plus" (manufactured by Du Pont Mitsui Fluorochemicals Co., Ltd.) 959HP-Plus contains 4.3 mol % of PAVE. |

TABLE 2

| PFPE | |
| --- | --- |
| PFPE-1 | "Krytox GPL107" (manufactured by Chemours Company) |
| PFPE-2 | "Demnum S200" (manufactured by Daikin Industries, Ltd.) |
| PFPE-3 | "Fomblin M60" (manufactured by Solvay Japan, Ltd.) |
| PFPE-4 | "Krytox VPF16256" (manufactured by Chemours Company) |
| PFPE-5 | "Krytox XHT-750" (manufactured by Chemours Company) |
| PFPE-6 | "Krytox XHT-1000" (manufactured by Chemours Company) |

Example 1

(Manufacture of Release Layer)

PFA-1 containing 1.2 mol % of PAVE in the molecular chain and PFPE-1 were mixed and stirred in a stirrer so that a ratio of the mass of PFPE to the total mass of PFA and PFPE (hereinafter, referred to as "PFPE/(PFA+PFPE)") is 0.10 to obtain a mixture of PFA and PFPE.

The mixture was injected into a twin-screw extruder and kneaded under conditions in which a screw diameter is 46 mm, a screw rotation speed is 180 rpm, and a cylinder temperature is 350° C. to 420° C. PFA/PFPE pellets were prepared by cooling and cutting the extruded composition.

The thus-prepared PFA/PFPE pellets were injected into a single screw extruder having a screw diameter of 40 mm, extruded into a tube shape vertically downwardly while melting the PFA/PFPE pellets at an extrusion rate of 50 g/min and a cylinder temperature of 320° C. to 370° C., and the tube was stretched at a tensile rate of 3.0 m/min to produce a fluororesin tube for a release layer having a thickness of 50 μm. In addition, a mandrel was adjusted so that an inner diameter of the fluororesin tube was 30 mm.

A measurement sample 1 was taken from the obtained fluororesin tube and dynamic viscoelasticity (hereinafter, referred to as "tan δ1") at a frequency of 10 Hz and a temperature of 180° C. was measured according to the method described above. Further, the storage elastic modulus E was also measured according to the method described above.

In addition, a measurement sample 2 was separately obtained from the obtained fluororesin tube and heated in an oven at a temperature of 180° C. for 200 hours. With respect to the measurement sample 2 after heating, the dynamic viscoelasticity (hereinafter, referred to as "tan δ2") at a frequency of 10 Hz and a temperature of 180° C. was measured according to the method described above.

(Manufacture of Base Material and Elastic Layer)

As a base material, a base material having an endless belt shape made of electroformed nickel having an inner diameter of 30 mm, a width of 400 mm, and a thickness of 40 μm was prepared. Primer treatment was applied to an outer peripheral surface of this base material.

As a raw material for forming an elastic layer, an addition-curing type liquid silicone rubber without including a filler (Product name: SE 1886, manufactured by Dow Corning Toray Co., Ltd.) was prepared. To 61 parts by volume of the liquid silicone rubber, 38 parts by volume of spherical alumina (Product name: Alunabeads CB-A305, manufactured by Showa Denko K.K.) as a spherical filler, and 1 part by volume of gas phase method carbon fiber (Product name: VGCF-S, manufactured by Showa Denko K.K., aspect ratio=100, average fiber length=10 μm) as a release filler were added. Thus, an addition-curing type silicone rubber composition for forming the elastic layer was prepared. These were applied on the outer peripheral surface of the above base material by a ring coating method and heated at a temperature of 200° C. for 4 hours to crosslink a layer of the addition-curing type silicone rubber composition, thereby forming an elastic layer having a thickness of 300 μm.

The base material on which the elastic layer was formed was rotated at a moving speed of 20 mm/sec in a circumferential direction, and a surface of the elastic layer was irradiated with UV rays in the atmosphere using an ultraviolet lamp in which a separation distance is 10 mm from the surface of the elastic layer. As the ultraviolet lamp, a low pressure mercury ultraviolet lamp (Product name: GLQ500US/11, manufactured by Toshiba Lighting and Technology Corporation) was used to irradiate an irradiated surface so that a cumulative light amount of the wavelength of 185 nm was 800 mJ/cm$^2$.

(Manufacture of Fixing Member)

Subsequently, onto the surface of the elastic layer, an addition-curing type silicone rubber adhesive (Product name: SE1819CV, a mixture of equal amounts of "Solution A" and "Solution B" manufactured by Dow Corning Toray Co., Ltd.) was applied almost uniformly so that a thickness was about 20 μm.

Next, the fluororesin tube manufactured as above was covered as the release layer, and a surface of the belt was uniformly handled over the fluororesin tube, and thus an excessive adhesive was handled between the elastic layer and the fluororesin tube.

Then, in an electric furnace set at a temperature of 200° C., an elastic layer and a base material coated with the fluororesin tube on a peripheral surface of the elastic layer were placed and heated for 1 hour to cure the adhesive so that the fluororesin tube was adhered onto the elastic layer, and then both ends were cut to obtain a fixing belt having a width of 343 mm. With respect to this fixing belt, evaluation of scratch resistance (evaluation 1), measurement of surface free energy of the release layer (evaluation 2), and evaluation of gloss unevenness in the electrophotographic image (evaluation 3) were performed as described below.

Examples 2 to 9

A fluororesin tube according to each Example was manufactured in the same manner as the fluororesin tube according to Example 1 except that the PFA type and PFPE type used for producing the fluororesin tube were changed as shown in Table 3 (wherein PFA-2 contains 4.3 mol % of PAVE in the molecular chain). With respect to each fluororesin tube, tan δ1, storage elastic modulus E', and tan δ2 were measured in the same manner as in Example 1.

In addition, a fixing belt according to each Example was manufactured in the same manner as in Example 1 except that the fluororesin tube according to each Example was used. These fixing belts were provided to Evaluation 1, Evaluation 2, and Evaluation 3 to be described below.

Examples 10 to 13

A fluororesin tube according to each Example was manufactured in the same manner as in the fluororesin tube according to Example 4 except that a mixing ratio (PFPE/(PFA+PFPE)) of PFA and PFPE used for producing the fluororesin tube was changed as shown in Table 3. With respect to each fluororesin tube, tan δ1, storage elastic modulus E, and tan δ2 were measured in the same manner as in Example 1.

In addition, a fixing belt according to each Example was manufactured in the same manner as in Example 1 except that the fluororesin tube according to each Example was used. These fixing belts were provided to Evaluation 1, Evaluation 2, and Evaluation 3 to be described below.

TABLE 3

| | PFA type | PFPE type | PFPE/ (PFA + PFPE) |
|---|---|---|---|
| Example 1 | PFA-1 | PFPE-1 | 0.10 |
| Example 2 | PFA-1 | PFPE-2 | 0.10 |
| Example 3 | PFA-1 | PFPE-3 | 0.10 |
| Example 4 | PFA-2 | PFPE-1 | 0.10 |
| Example 5 | PFA-2 | PFPE-2 | 0.10 |
| Example 6 | PFA-2 | PFPE-3 | 0.10 |
| Example 7 | PFA-2 | PFPE-4 | 0.10 |
| Example 8 | PFA-2 | PFPE-5 | 0.10 |
| Example 9 | PFA-2 | PFPE-6 | 0.10 |
| Example 10 | PFA-2 | PFPE-1 | 0.012 |
| Example 11 | PFA-2 | PFPE-1 | 0.051 |
| Example 12 | PFA-2 | PFPE-1 | 0.29 |
| Example 13 | PFA-2 | PFPE-1 | 0.38 |

Subsequently, the manufactured fixing member was evaluated.

<Evaluation 1: Evaluation of Scratch Resistance>

When paper to be conveyed comes into contact with the fixing member, scratches (paper edge scratches) caused by burrs at the paper end portion are likely to occur, and image defects occur when using paper having a width larger than a position in which paper edge scratches occur.

For this reason, scratch resistance was evaluated by observing the fixed image after continuous paper feeding durability. The fixing members manufactured in Examples and Comparative Examples were mounted on an electrophotographic image forming apparatus (Product name: imageRUNNER-ADVANCE C5051, manufactured by Canon Inc.), and 1000 sheets of hammermill paper (products with basis weight of 75 g/m² manufactured by International paper company) were continuously fed into the electrophotographic image forming apparatus. Thereafter, a fixed image of Bk toner was formed on almost the entire surface of the paper at a concentration of 100% using an OK top coat paper (manufactured by Oji Paper Co., Ltd., with basis weight of 157 g/m²) which is high gloss paper. The image level of the letter size paper width was visually observed by using this fixed image as an image for evaluation, and image influence was evaluated based on the following criteria.

Rank A: No image defects were observed due to scratches on the release layer of the fixing member.
Rank B: A difference in gloss due to scratches on the release layer of the fixing member was observed.
Rank C: An unfixed portion of the toner or a remarkable difference in gloss due to scratches on the release layer of the fixing member was observed.

(Evaluation 2: Measurement of Surface Free Energy of Release Layer)

The surface free energy of the release layer can be calculated by a method of "Kitazaki and Hata" described in "Journal of the Adhesion Society of Japan", the Japan Society of Adhesion, 1972, Vol. 8, No. 3, p. 131-141. First, water, n-hexadecane, and diiodomethane were used as a standard liquid, and the contact angle of the release layer of the fixing belt was measured (measurement environment: temperature of 23° C. and relative humidity of 55%). Subsequently, the measurement result of each contact angle was used to determine the surface free energy from "expansion Fowkes formula" according to the theory of Kitazaki and Hata described in "2. Extension of Fowkes formula" to "3. Surface tension of solid polymer and the components thereof" in p. 131 of "Journal of the Adhesion Society of Japan", the Japan Society of Adhesion, 1972, Vol. 8, No. 3, p. 131-141.

A contact angle meter (Product name: DM-501, manufactured by Kyowa Interface Science, Inc.) was used for the measurement, and analysis software (Product name: FAMAS, manufactured by Kyowa Interface Science Inc.) was used for surface free energy analysis.

(Evaluation 3: Evaluation of Gloss Unevenness in Electrophotographic Image)

The followability of the fixing member with respect to irregularities present on the rough paper was evaluated by whether or not gloss unevenness was seen in the fixed solid image formed on the rough paper.

The manufactured fixing member was mounted on an electrophotographic image forming apparatus (Product name: imageRUNNER-ADVANCE C5051, manufactured by Canon Inc.) and a fixed image composed of secondary colors of cyan toner and magenta toner was formed at a concentration of 100% on almost the entire surface of a A4 size rough paper (Product name: Business 4200, manufactured by Xerox Corporation, thickness: 102 μm, basis weight: 75 g/m²). This fixed image was used as an image for evaluation, and visually observed by five subjects, and evaluated based on the following criteria.

Rank A: 4 or more people judged that the gloss unevenness is small.
Rank B: 3 people judged that the gloss unevenness is small.
Rank C: 2 or less people judged that the gloss unevenness is small.

Results of "tan $\delta 1$", "tan $\delta 2$", a storage elastic modulus E of the fluororesin tubes according to Examples 1 to 13, and "Evaluation 1", "Evaluation 2", and "Evaluation 3" of the fixing belt according to Examples 1 to 13 are shown in Table 4.

Comparative Example 1

A fluororesin tube was manufactured in the same manner as in Example 1 except that PFPE-1 was not used. With respect to this fluororesin tube, tan $\delta 1$, a storage elastic modulus E', and tan $\delta 2$ were measured in the same manner as in Example 1.

Further, a fixing belt was manufactured in the same manner as in Example 1 except that this fluororesin tube was used. This fixing belt was provided to Evaluation 1, Evaluation 2, and Evaluation 3 to be described below.

Comparative Example 2

A fluororesin tube was manufactured in the same manner as in Example 4 except that PFPE-1 was not used. With respect to this fluororesin tube, tan $\delta 1$, a storage elastic modulus E, and tan $\delta 2$ were measured in the same manner as in Example 1.

Further, a fixing belt was manufactured in the same manner as in Example 1 except that this fluororesin tube was used. This fixing belt was provided to Evaluation 1, Evaluation 2, and Evaluation 3.

Comparative Example 3

Pellets of PFA-3 in which a content of PAVE in the molecular chain increased to 9.8 mol % were prepared by the method described in Japanese Patent Application Laid-Open No. 2004-161921. A fluororesin tube was manufactured in the same manner as the fluororesin tube according to Example 1 except that this pellet was used. With respect to this fluororesin tube, tan $\delta 1$, a storage elastic modulus E, and tan $\delta 2$ were measured in the same manner as in Example 1.

Further, a fixing belt was manufactured in the same manner as in Example 1 except that this fluororesin tube was used. This fixing belt was provided to Evaluation 1, Evaluation 2, and Evaluation 3.

Comparative Example 4

Pellets of a fluororesin in which 5.0% by weight of carbon black was dispersed in PFA-1, were prepared according to the method described in Japanese Patent Application Laid-Open No. 2003-82187. A fluororesin tube was manufactured in the same manner as the fluororesin tube according to Example 1 except that this pellet was used. With respect to this fluororesin tube, tan $\delta 1$, a storage elastic modulus E, and tan $\delta 2$ were measured in the same manner as in Example 1.

Further, a fixing belt was manufactured in the same manner as in Example 1 except that this fluororesin tube was used. This fixing belt was provided to Evaluation 1, Evaluation 2, and Evaluation 3.

Results of "Tan $\delta 1$", "tan $\delta 2$", a storage elastic modulus E of the fluororesin tubes according to Comparative Examples 1 to 4, and "Evaluation 1", "Evaluation 2", and "Evaluation 3" of the fixing belt according to Comparative Examples 1 to 4 are shown in Table 4.

TABLE 4

| | | Tanδ1 [×10⁻²] | Tanδ2 [×10⁻²] | Storage elastic modulus E' [MPa] | Rank of Evaluation 1 | Evaluation 2 Surface free energy [mJ/m²] | Rank of Evaluation 3 |
|---|---|---|---|---|---|---|---|
| Example | 1 | 8.7 | 8.6 | 48.0 | A | 13.8 | B |
| | 2 | 8.1 | 8.1 | 50.0 | A | 13.7 | B |
| | 3 | 6.5 | 6.3 | 53.0 | B | 13.9 | B |
| | 4 | 8.4 | 8.4 | 15.0 | A | 13.6 | A |
| | 5 | 8.2 | 8.2 | 18.0 | A | 13.8 | A |
| | 6 | 6.9 | 6.8 | 22.0 | B | 13.5 | A |
| | 7 | 8.4 | 8.3 | 16.0 | A | 13.9 | A |
| | 8 | 8.3 | 8.2 | 16.7 | A | 13.7 | A |
| | 9 | 8.2 | 8.2 | 17.5 | A | 14.0 | A |
| | 10 | 5.2 | 5.2 | 31.0 | B | 13.8 | B |
| | 11 | 7.1 | 7.0 | 28.0 | A | 13.7 | A |
| | 12 | 15.0 | 14.0 | 9.5 | A | 13.9 | A |
| | 13 | 28.0 | 26.0 | 5.2 | A | 13.6 | A |
| Comparative Example | 1 | 3.9 | 3.9 | 68.0 | C | 16.9 | C |
| | 2 | 3.8 | 3.7 | 35.0 | C | 17.4 | B |
| | 3 | 4.0 | 3.9 | 9.4 | C | 17.8 | A |
| | 4 | 3.2 | 3.2 | 78.0 | B | 18.9 | C |

From Table 4, it could be appreciated that the fixing member according to this embodiment had excellent toner releasability and excellent scratch resistance, and as a result, it was possible to form a high-quality electrophotographic image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-055190, filed Mar. 22, 2018, and Japanese Patent Application No. 2019-028564, filed Feb. 20, 2019, which are hereby incorporated by reference herein in their entirety.

What is claimed is:

1. A fixing member comprising a base material, an elastic layer, and a release layer in this order,
wherein the release layer includes a tetrafluoroethylene/perfluoroalkyl vinyl ether copolymer, and
wherein the release layer has a loss tangent at a frequency of 10 Hz and 180° C. of $5.0 \times 10^{-2}$ to $3.0 \times 10^{-1}$.

2. The fixing member according to claim 1, wherein the release layer further includes perfluoropolyether.

3. The fixing member according to claim 2, wherein the perfluoropolyether has a structure represented by Structural Formula (1):

Structural Formula (1)

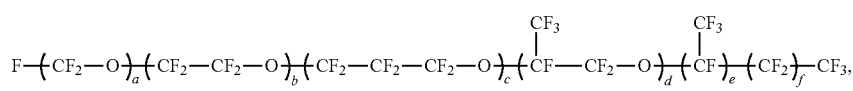

wherein, in the Structural Formula (1), a, b, c, d, e and f are each independently 0 or a positive integer satisfying $1 \le a+b+c+d+e+f \le 600$, and at least one of a, b, c, and d is a positive integer, and
wherein order of existence of each repeating unit in the Structural Formula (1) is not limited to that in the Structural Formula (1), and the each repeating unit may exist at a plurality of portions in the perfluoropolyether represented by the Structural Formula (1).

4. The fixing member according to claim 3, wherein the perfluoropolyether has a structure of any one of Structural Formulas (2) to (4):

Structural Formula (2):
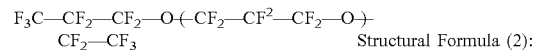

wherein, in the Structural Formula (2), n represents an integer of 1 or more;

Structural Formula (3)
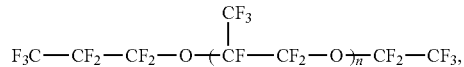

wherein, in the Structural Formula (3), n represents an integer of 1 or more; and Structural Formula (3)
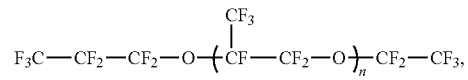

wherein, in the Structural Formula (4), n and m each independently represent an integer of 1 or more.

5. The fixing member according to claim 2, wherein a content of the perfluoropolyether is 1% by mass to 40% by mass with respect to a total amount of the tetrafluoroethylene/perfluoroalkyl vinyl ether copolymer and the perfluoropolyether.

6. The fixing member according to claim 1, wherein the release layer has a storage elastic modulus E' at the frequency of 10 Hz and 180° C. of 5.0 MPa to 60 MPa.

7. The fixing member according to claim 1, wherein the release layer has the loss tangent at the frequency of 10 Hz and 180° C. of $7.0 \times 10^{-2}$ to $3.0 \times 10^{-1}$.

8. The fixing member according to claim 1, wherein the release layer has a storage elastic modulus E at the frequency of 10 Hz and 180° C. of 0 MPa to 30 MPa.

9. The fixing member according to claim 1, wherein the fixing member is a fixing belt having an endless belt shape.

10. A fixing device comprising a fixing member and a heating unit for the fixing member,
   wherein the fixing member has a base material, an elastic layer, and a release layer in this order,
   wherein the release layer includes a tetrafluoroethylene/perfluoroalkyl vinyl ether copolymer, and
   wherein the release layer has a loss tangent at a frequency of 10 Hz and 180° C. of $5.0 \times 10^{-2}$ to $3.0 \times 10^{-1}$.

11. The fixing device according to claim 10, wherein the fixing member is a fixing belt having an endless belt shape, and the heating unit is a heater arranged in contact with an inner peripheral surface of the fixing belt.

12. An electrophotographic image forming apparatus comprising a fixing device,
   wherein the fixing device includes a fixing member and a heating unit for the fixing member,
   wherein the fixing member has a base material, an elastic layer, and a release layer in this order,
   wherein the release layer includes a tetrafluoroethylene/perfluoroalkyl vinyl ether copolymer, and
   wherein the release layer has a loss tangent at a frequency of 10 Hz and 180° C. of $5.0 \times 10^{-2}$ to $3.0 \times 10^{-1}$.

* * * * *